(12) United States Patent  
Wright

(10) Patent No.: US 7,702,369 B1
(45) Date of Patent: Apr. 20, 2010

(54) METHOD OF INCREASING BATTERY LIFE IN A WIRELESS DEVICE

(75) Inventor: David Wright, Escondido, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1234 days.

(21) Appl. No.: 10/877,242

(22) Filed: Jun. 25, 2004

(51) Int. Cl.
*H04B 1/38* (2006.01)

(52) U.S. Cl. .................. 455/571; 455/574; 455/504; 455/41.2

(58) Field of Classification Search .......... 455/574, 455/445, 572, 550.1, 571, 403, 108, 504, 455/41.2, 556.1, 115.1, 67.11; 713/300; 340/539.1, 539.21; 327/536
See application file for complete search history.

(56) References Cited

U.S. PATENT DOCUMENTS

| | | | | |
|---|---|---|---|---|
| 5,777,462 A * | 7/1998 | Yue | ................. | 323/285 |
| 6,138,042 A * | 10/2000 | Midya et al. | ................. | 455/571 |
| 6,141,762 A * | 10/2000 | Nicol et al. | ................. | 713/300 |
| 6,307,281 B1 * | 10/2001 | Houston | ................. | 307/31 |
| 2003/0020821 A1 * | 1/2003 | Watanabe et al. | ........... | 348/312 |
| 2003/0169097 A1 * | 9/2003 | Henry | ................. | 327/536 |
| 2003/0231031 A1 * | 12/2003 | Cojocaru | ................. | 326/127 |
| 2004/0025065 A1 * | 2/2004 | Lou | ................. | 713/300 |
| 2004/0048613 A1 * | 3/2004 | Sayers et al. | ............. | 455/426.2 |
| 2004/0080361 A1 * | 4/2004 | Henry | ................. | 327/536 |
| 2004/0130526 A1 * | 7/2004 | Rosenberg | ............. | 345/156 |
| 2005/0007047 A1 * | 1/2005 | Strothmann et al. | ........ | 318/268 |
| 2005/0213593 A1 * | 9/2005 | Anderson et al. | .......... | 370/419 |
| 2005/0250557 A1 * | 11/2005 | Marschalkowski et al. | .. | 455/574 |
| 2006/0255932 A1 * | 11/2006 | Kranz et al. | ............ | 340/539.1 |
| 2007/0058599 A1 * | 3/2007 | Harsch | ................. | 370/338 |

* cited by examiner

*Primary Examiner*—Tan Trinh

(57) ABSTRACT

Disclosed is a circuit, comprising a device having a minimum operating voltage, a voltage supply, wherein the voltage supply may have a value above or below or equal to the minimum operating voltage of the device, a voltage boost converter circuit having a boosted voltage output, a switch coupled between the voltage supply, the boosted voltage output and the device, wherein the switch is capable of passing one of the voltage supply or the boosted voltage output to the device, and a processing element capable of controlling the switch. A system comprising the circuit and a method of using the circuit are further described.

20 Claims, 5 Drawing Sheets

METHOD OF INCREASING BATTERY LIFE IN A WIRELESS DEVICE

TECHNICAL FIELD

The present invention relates generally to electronic circuits and in particular to circuits for wireless communication powered by battery.

BACKGROUND

One of the leading challenges facing designers of wireless products is achieving acceptable battery life without requiring large batteries that would impact the weight and form factor of the product. An important step in increasing battery life of wireless devices is to reduce the power consumed by integrated circuits (ICs) inside the device.

Integrated circuits are typically specified with a guaranteed operating voltage range. The manufacturer guarantees operation above a minimum voltage termed Vcc(min), and below a maximum operating voltage termed Vcc(max). A somewhat higher "Absolute Maximum" supply voltage is also specified above which damage to the IC may occur. Operation from a supply greater than Vcc(max) but lower than the absolute maximum is not guaranteed, but no damage will result to the IC.

In practice, most ICs will operate correctly somewhat below Vcc(min). In order to guarantee operation at a specified Vcc(min), IC manufacturers typically test operation both slightly above the maximum rated temperature, and slightly below the minimum rated temperature at a voltage somewhat below Vcc(min). The voltage at which an IC will cease to operate correctly will generally therefore be below the Vcc(min), and in many cases well below Vcc(min) if the device is operated at room temperature.

In one example, an IC may be rated with a Vcc(min) of 2.7V and Vcc(max) of 3.6V, with an operating temperature range of 0 to 70 degrees Celsius. The IC manufacturer may test every device at 2.6V at both minus 10 and plus 80 degrees Celsius. In this example, a typical instance of the IC may work correctly in all respects down to 2.5V, and with degraded performance down to 2.3V, provided that the temperature of operation is constrained to a smaller range than that specified, for example plus 10 to minus 40 degrees. In some cases, it may be easy to determine whether or not an IC being supplied with a lower voltage than specified is performing correctly; in other cases, it may not.

Many ICs are used in battery powered applications where the output voltage range of the batteries does not match the operating voltage range of the IC. In such cases, there may be a number of different ICs, with different operating voltage ranges. In this case, it is common to use a direct current to direct current (DC-DC) boost converter to supply an approximately constant voltage to all ICs, ensuring correct operation of the ICs regardless of the output voltage of the batteries. A disadvantage of this approach is that for part of the life of the batteries the output may be being boosted unnecessarily, causing the batteries to be drained more quickly than necessary.

DETAILED DESCRIPTION

Figure 1:
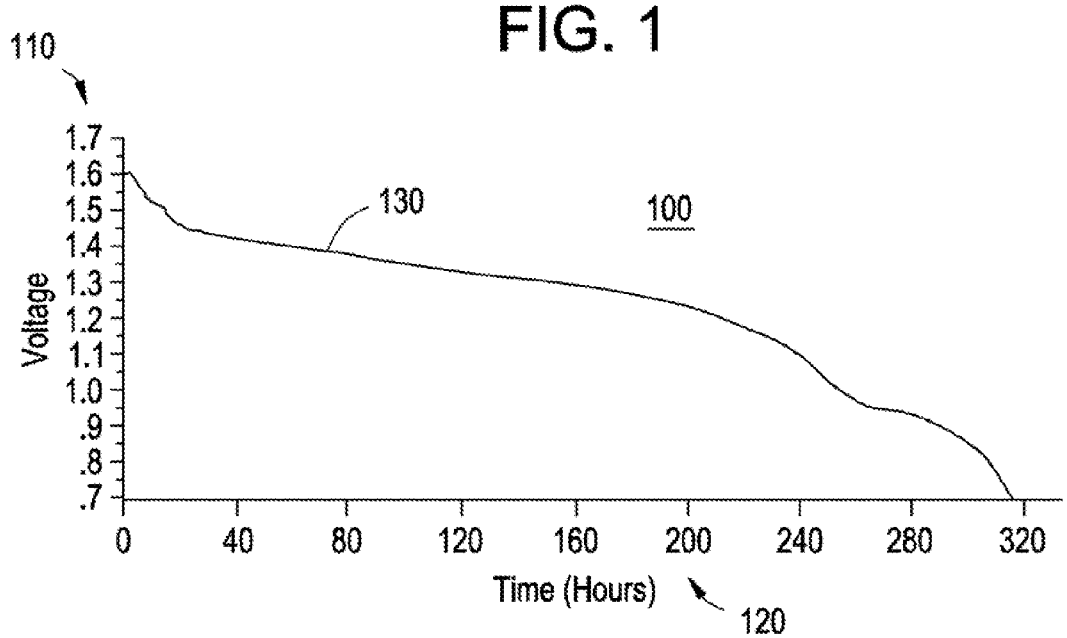
FIG. 1 shows output characteristics of a alkaline AA battery cell.

In a wireless optical mouse the main ICs used are a microcontroller (MCU), an optical sensor, and a radio IC. In this example, the mouse is powered from two AA alkaline cells, and the output voltage characteristic of one such cell is shown in FIG. 1. FIG. 1 comprises a graph 100, having a y-axis 110 showing battery voltage, and an x-axis 120 showing time in terms of hours of battery use. From the slope of FIG. 1, for approximately the initial three quarters of the battery life the voltage stays above 1.2 Volts and for the final one quarter of the battery life the voltage is below 1.2 Volts.

In an example, the microcontroller has an operating voltage range of 3.0V to 3.6V, the sensor 3.0V to 3.6V, and the radio IC 2.7 to 3.6V. The microcontroller and optical sensor must be powered from a boosted supply because the battery voltage only falls within the operating voltage range of the sensor for a tiny fraction of the battery life.

One example of a system where a method of bypassing a DC boost converter would be useful is a wireless optical mouse. In a wireless optical mouse, the radio IC may similarly be powered from the boost converter output, and the boost converter may generate 3.3V in order to guarantee that ripple, tolerance, and other undesirable phenomena did not cause the boost converter output ever to fall below 3.0V, the minimum operating voltage of the sensor.

In the wireless optical mouse, there is no easy way to determine whether or not the optical sensor is performing correctly when supplied with a voltage below Vcc(min). Therefore, it is not possible to supply the sensor with a voltage <3.0V and test whether the sensor is operating correctly. However, if the radio IC is a radio transceiver, it may be possible to determine whether or not the radio IC is performing correctly at a voltage below the guaranteed minimum operating voltage, by monitoring the bit error rate (BER) of the output of a device. Alternatively a built in self test (BIST) could be used.

In the wireless optical mouse, when the mouse is not moving, the microcontroller, the mouse sensor and the radio are all held in a low power "sleep" mode. Periodically, the microcontroller will wake from this mode, wake the optical sensor, and check for movement; if no movement is detected, the microcontroller and sensor will return to sleep mode. If motion is detected, the microcontroller will wake the radio, and attempt to establish communications with the an interface or "dongle", which is connected to the computer with which the mouse is designed to operate. A dongle is a term used to describe an interface device that is coupled to a computer to act as a transmitter or receiver or other kind of translator device for input and/or output signals.

On receiving communications from the wireless mouse device, the dongle will transmit back to the mouse an "acknowledge" data packet (ACK), and the mouse microcontroller will know that the wireless link is working correctly, and begin periodically transmitting mouse motion data for as long as the mouse is moving. Each such mouse motion data packet will be acknowledged by the dongle, so that in the case of a high bit error rate or a breakdown in the wireless link, the mouse can re-transmit the data which was lost.

The wireless mouse described is one of many methods of communicating between the mouse and dongle, and variants are possible. In another example, the MCU and sensor together draw 15 mA when the mouse is being moved, and the radio draws an average of 10 mA. The boost converter is 80% efficient, and the life-average output voltage of the batteries is 1.2V. The average current drawn from the batteries is therefore (3.3/2.4)*(100/80)*25=43 mA. With a battery life of 2850 mAh, the typical battery life of the mouse is 66 hours of cumulative mouse motion (this is equivalent to two to three months of typical mouse usage).

Figure 2:
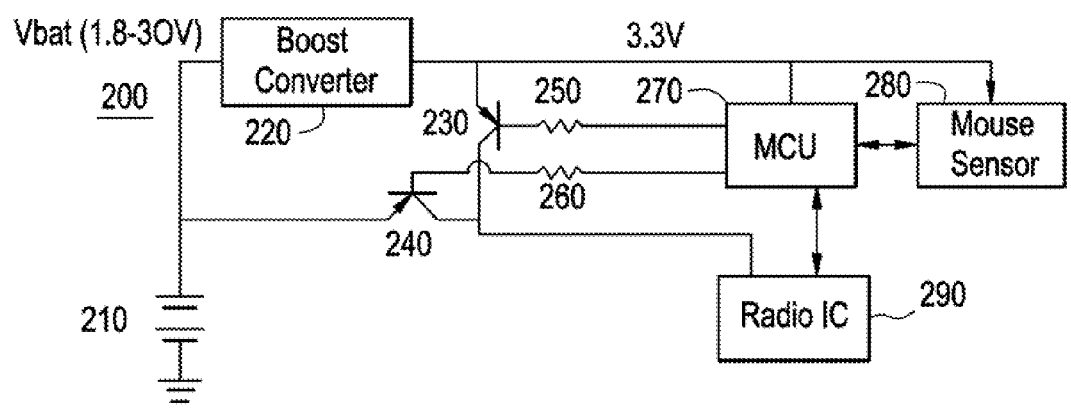
FIG. 2 shows an architecture for a wireless device having increased battery life.

An embodiment of an improved method and apparatus for increasing the battery life of a wireless device is described. A schematic of the hardware of an exemplary implementation of the improved method and apparatus is shown in FIG. 2. The implementation of FIG. 2 comprises an architecture 200 for a wireless device having increased battery life. The architecture 200 comprises a battery 210, a boost converter 220, a first switch 230, a second switch 240, a first resistor 250, a second resistor 260, a processing element (in a preferred element a processing element 270, a mouse sensor 280, and a radio device 290. The function of the boost converter 220 is to take an input voltage or range of input voltages and boost it up to a desired output voltage. The output 220 of the boost converter is used in one embodiment to power the microcontroller 270 and the mouse sensor 280, and indirectly to power the radio IC 290. In FIG. 2, bipolar transistors 230 and 240 together with resistors 250 and 260 are shown as a low-cost option for switching the voltage supply to the radio. Field effect transistors (FETs) or other electrical switching components may be substituted, for example switching diodes. In a preferred embodiment the processing element is a microcontroller, but may also be replaced with a general purpose microprocessor, a digital signal processor, a programmable logic processor, a state machine, or other processing function.

Figure 3:
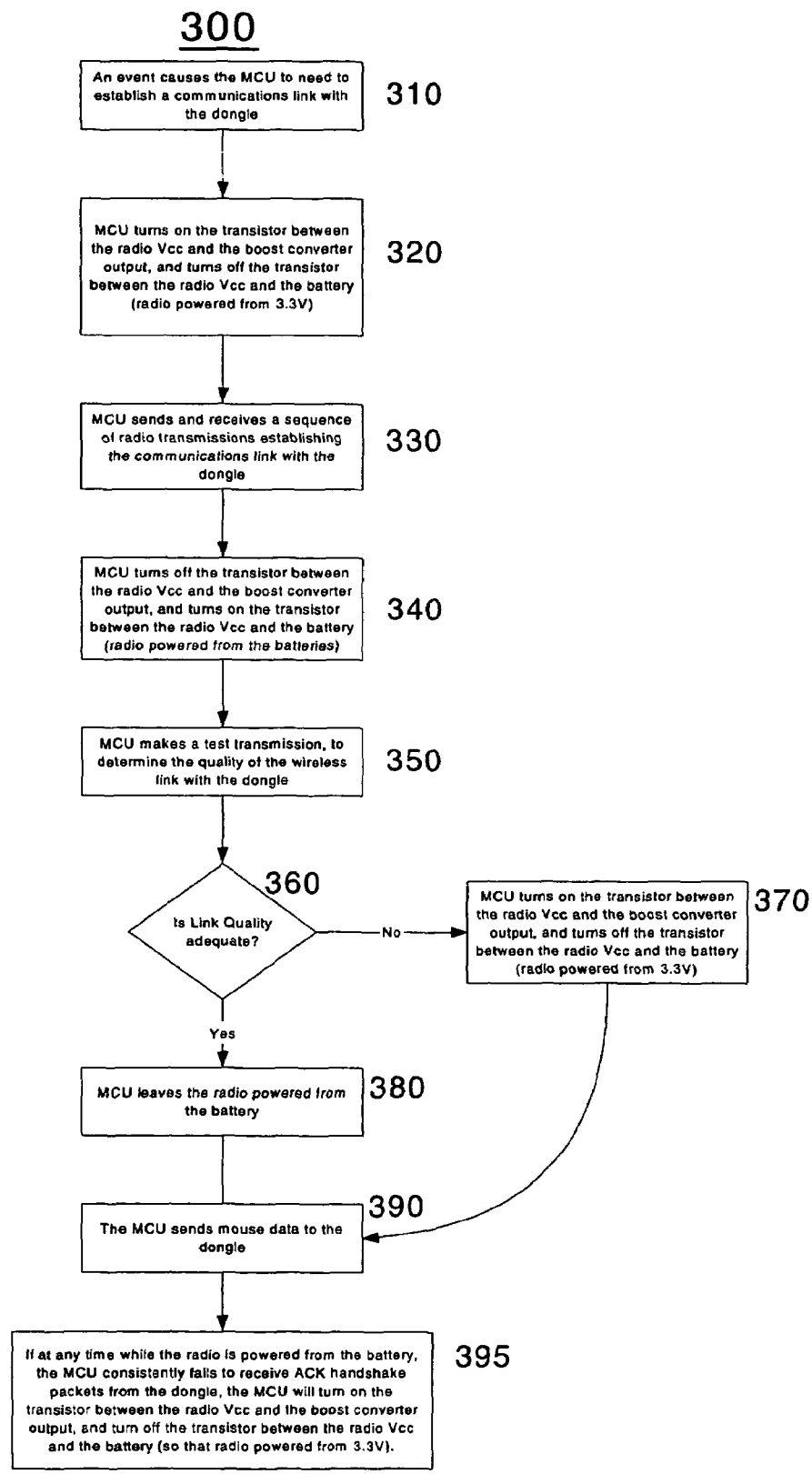
FIG. 3 shows a method for increasing battery life of a wireless device.

The improved method and apparatus improves upon the conventional implementation using a method 300 for increasing battery life of a wireless device, as shown in FIG. 3. The method operates by powering the radio IC directly from the battery voltage until the battery voltage has fallen to a level where the radio ceases to perform sufficiently well to maintain a wireless communication link with the dongle. The method 300 comprises a number of steps, as described. In a first step 310, an event causes the microcontroller to need to establish a communications link with the dongle. In a second step 320, the microcontroller turns on the transistor between the radio Vcc and the boost converter output, and turns off the transistor between the radio Vcc and the battery (radio powered from 3.3V). In a third step 330, the microcontroller sends and receives a sequence of radio transmissions establishing the communications link with the dongle. In a fourth step 340, the microcontroller turns off the transistor between the radio Vcc and the boost converter output, and turns on the transistor between the radio Vcc and the battery (radio powered from the batteries). In a fifth step 350, the microcontroller makes a test transmission, to determine the quality of the wireless link with the dongle. In a sixth step 360, the determination is made as to whether the quality of the link is inadequate, and if it is inadequate then the microcontroller turns on the transistor between the radio Vcc and the boost converter output, and turns off the transistor between the radio Vcc and the battery (radio powered from 3.3V). If the quality of the link is good, the MCU leaves the radio powered from the battery. In a seventh step 370, the microcontroller sends mouse data to the dongle. In an eighth step 380, if at any time while the radio is powered from the battery the MCU consistently fails to receive ACK handshake packets from the dongle, then the microcontroller will turn on the transistor between the radio Vcc and the boost converter output, and turn off the transistor between the radio Vcc and the battery (so that radio powered from 3.3V).

Figure 4:
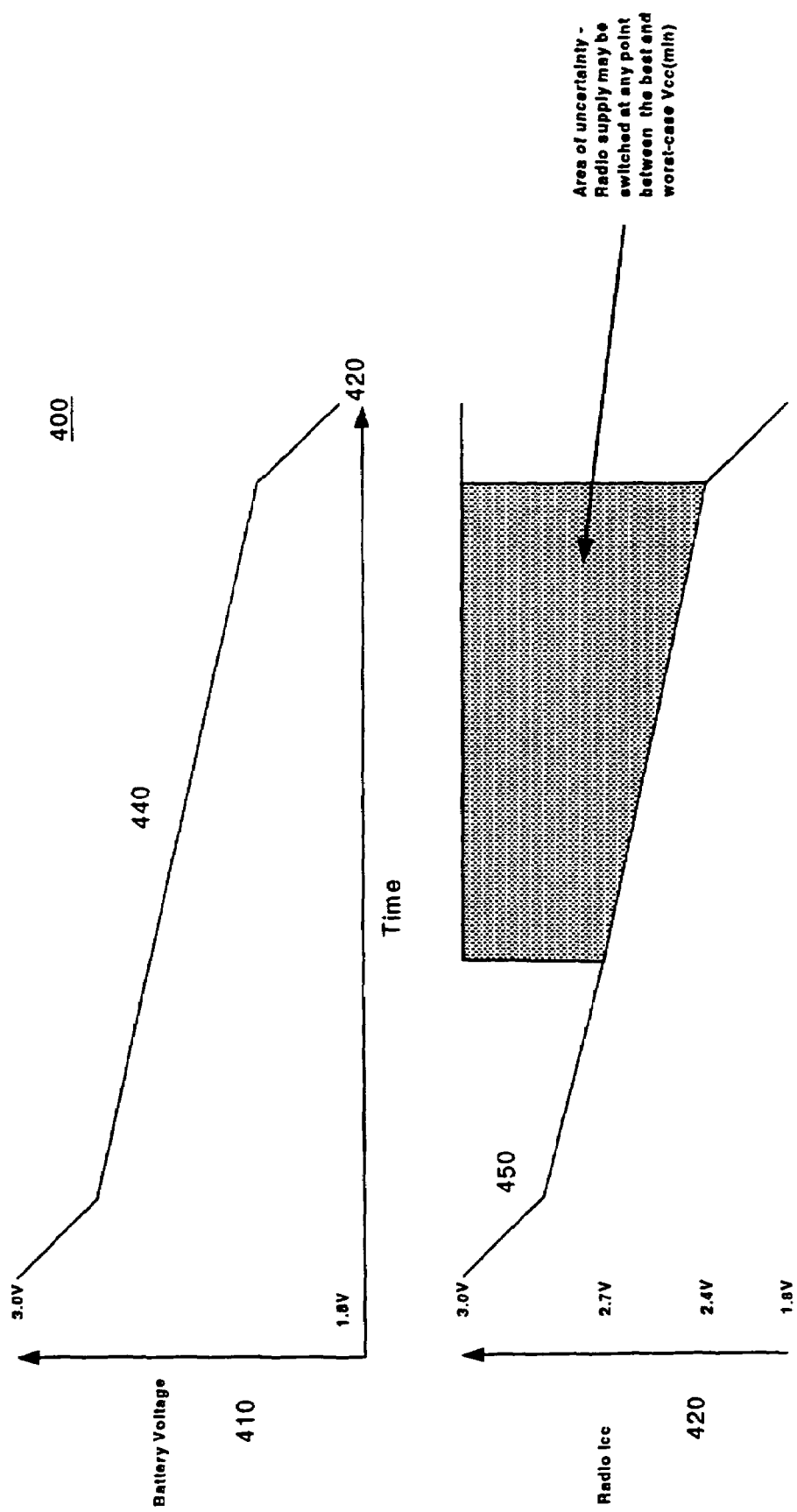
FIG. 4 shows operation of the wireless device having increased battery life.

In the exemplary embodiment, the radio IC will typically operate down to 2.4V. Above the 2.4V level the radio is consistently powered directly from the batteries. The battery voltage is above this voltage for about 75% of its life. During the remaining 25% of the battery life, the radio will be supplied from the boost converter. This operation is illustrated in the diagram of FIG. 4. FIG. 4 comprises a graph 400 showing operation of the wireless device having increased battery life. A first y-axis 410 shows the battery voltage, and x-axis 430 shows time elapsed. A second y-axis 420 shows the voltage supplied to the radio IC over the time shown in the X axis 430. Note that in FIG. 4, the x-axis is not shown to scale. Line 440 shows the drop in battery voltage over time used and line 450 shows the voltage supplied to the radio IC device. This voltage is supplied from the boost converter or the battery depending on whether the battery voltage is above the trip point (non-shaded area) or below the trip point (shaded area) The shaded area is an area of uncertainty, the radio supply may be switched at any point between the best and worst case Vcc (min).

In one exemplary embodiment the battery life may be calculated in the following manner. For the microcontroller and sensor, the average battery current is (3.3V/2.4V)*(100/80)*15, resulting in 26 mA current consumption. For the first approximately 75% of the battery life, the battery current required to supply the radio is 10 mA. For the remaining approximately 25% of the battery life, the average battery voltage is 1.05V, so the current is (3.3/2.1)*(100/80)*10, resulting in 19 mA. The overall average radio current is therefore 12 mA across the full lifetime of the battery.

In this exemplary embodiment, the overall average battery current is therefore 38 mA, giving a battery life of 75 hours. In this exemplary embodiment, the improved method and apparatus has extended battery life by 13%. This may be valuable, particularly in reducing the support burden on IT personnel by lowering the frequency at which batteries must be replaced, in reducing the expenditure on batteries, and on reducing the inconvenience to the user of having to have batteries replaced.

Figure 5:
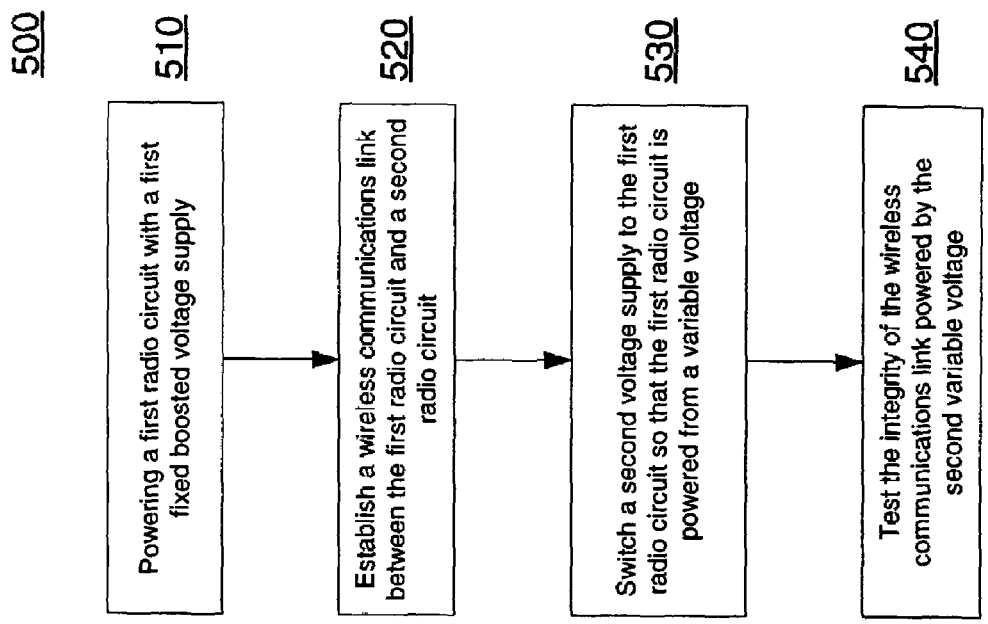
FIG. 5 shows a method of supplying a voltage to a first radio circuit.

FIG. 5 shows a method 500 for supplying a voltage to a first radio circuit. A first step 510 comprises powering the first radio circuit with a first fixed boosted voltage supply. A second step 520 comprises establishing a wireless communications link between the first radio circuit and a second radio circuit. A third step 530 comprises switching a second voltage supply to the first radio circuit so that the first radio circuit is powered from a variable voltage. A fourth step 540 comprises testing the integrity of the wireless communications link powered by the second variable voltage.

Figure 6:
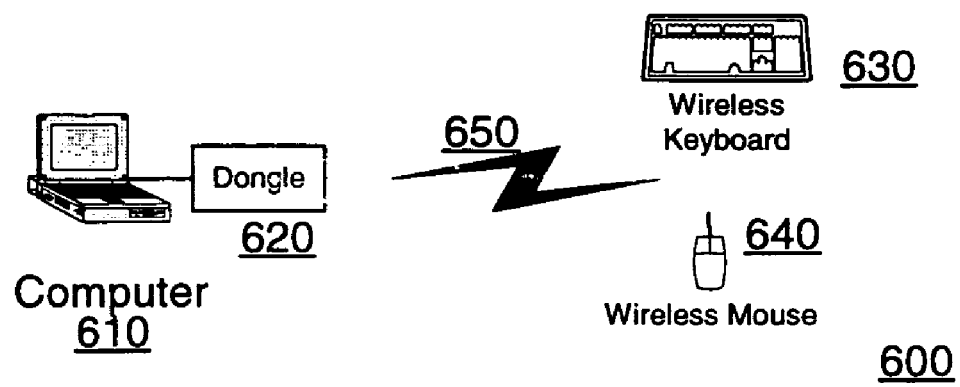
FIG. 6 is a system with a wireless device having increased battery life.

FIG. 6 shows a system 600 with a wireless device having increased battery life. The system comprises a computer 610, a dongle interface 620, a wireless device such as a wireless keyboard 630 or a wireless mouse 640, and a wireless link 650. The computer 610 communicates with the wireless device 630 or 640 through the dongle 620 and over the wireless link 650.

In a first alternative embodiment, the improved method and apparatus may be applied to any wireless device, in which the radio IC has a minimum operating voltage higher than the minimum battery voltage. The improved method and apparatus may also be applied to wireless devices where the radio is constructed from discrete components, and where the radio circuit may typically operate at a voltage below the calculated worst-case minimum.

The improved method and apparatus may be extended to any battery powered application in which an IC or circuit has a minimum operating voltage higher than the minimum battery voltage, and where it is possible to determine whether or not the IC or circuit is performing correctly when the supply voltage is lower than the guaranteed minimum operating voltage of the IC.

In a second alternate embodiment of the improved method and apparatus, the fixed-output boost converter is replaced with a variable output boost converter, the output being controlled by the microcontroller (or other processing element). In this variant, the microcontroller reduces the voltage of the boost converter output to a level just above that at which the radio (or other circuit) ceases to operate correctly.

The improved method and apparatus has the advantages of enabling longer battery life by powering the radio from the battery until the battery voltage falls to a level at which the radio ceases to operate satisfactorily.

For purposes of clarity, many of the details of wireless mouse controllers and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A circuit, comprising:
   a device having a minimum operating voltage;
   a voltage supply node to receive a voltage supply, wherein the voltage supply is configured to receive a value above or below or equal to the minimum operating voltage of the device;
   a voltage boost converter circuit having a boosted voltage output supply;
   a switch to pass the voltage supply or the boosted voltage output supply to the device coupled between the voltage supply, the boosted voltage output supply and the device; and
   a processing element coupled to the switch to control the switch based on integrity of a wireless communications link of the device.

2. The circuit of claim 1, further comprising where the processing element is capable of determining whether or not the circuit is functioning correctly.

3. The circuit of claim 2, wherein the device is a radio transceiver.

4. The circuit of claim 3, wherein the processing element tests the integrity of the wireless communications link from a bit error rate of RF communications with another radio device.

5. The circuit of claim 2, wherein the processing element is a microcontroller.

6. The circuit of claim 1, wherein the device is a wireless mouse.

7. The circuit of claim 1, wherein the device is a wireless keyboard.

8. The circuit of claim 1, wherein the variable voltage supply is provided by a battery.

9. A method for supplying a voltage to a first wireless circuit comprising:
   powering the first wireless circuit with a first fixed boosted voltage supply;
   establishing a wireless communications link between the first wireless circuit and a second wireless circuit;
   switching a second voltage supply to the first wireless circuit so that the first wireless circuit is powered from a variable voltage;
   testing integrity of the wireless communications link while the first wireless circuit is powered by the second variable voltage; and
   determining whether to switch the first fixed boosted voltage supply to the first wireless circuit based on the integrity of the wireless communications link.

10. The method of claim 9, further comprising
   if the integrity is good then sending data from the first wireless circuit to the second wireless circuit, otherwise if the wireless link is of inadequate integrity when the first wireless circuit is supplied from the variable voltage, switching the voltage supply to the first wireless circuit so that it is powered from the fixed, boosted voltage, and sending data from the first wireless circuit to the second wireless circuit.

11. The method of claim 9, wherein testing the integrity of the wireless communications link comprises calculating the Bit Error Rate (BER) of data received from the second wireless circuit which has been transmitted by the second wireless circuit in response to data received by the second wireless circuit from the first wireless circuit.

12. An apparatus, comprising:
   a processing element, wherein the processing element is configured to determine whether a device is functioning correctly based on integrity of a wireless communication link of the device;
   an output of the processing element, wherein the output is configured to control a switch that is configured to connect the device with one of a voltage supply or a boosted voltage supply based on whether the device is functioning correctly.

13. The apparatus of claim 12, wherein the processing element is a microprocessor.

14. The apparatus of claim 13, wherein the processing element determines whether the device is functioning correctly from a bit error rate of RF communications with a second radio device.

15. The apparatus of claim 12, wherein the voltage supply includes a battery and the boosted voltage supply includes the battery coupled with a boost converter.

16. The apparatus of claim 12, wherein the device is a radio transceiver.

17. A method, comprising:
    determining whether a device is functioning correctly based on integrity of a wireless communication link between a first device and a second device; and
    controlling a switch to connect the device with one of a first voltage supply or a second voltage supply based on whether the device is functioning properly.

18. The method of claim 17, wherein the voltage supply includes a battery and the boosted voltage supply includes the battery coupled with a boost converter.

19. The method of claim 17, wherein the first device is a radio transceiver.

20. The method of claim 17, wherein determining whether the first device is functioning correctly is based on a bit error rate of RF communications link with the second device.

* * * * *